United States Patent [19]

Meissner et al.

[11] Patent Number: 4,907,687
[45] Date of Patent: Mar. 13, 1990

[54] PEAR ORIENTING APPARATUS

[75] Inventors: Konrad E. Meissner, Lafayette; Marvin F. Quay, Concord, both of Calif.

[73] Assignee: Atlas Pacific Engineering Company, Pueblo, Colo.

[21] Appl. No.: 650,695

[22] Filed: Sep. 17, 1984

Related U.S. Application Data

[62] Division of Ser. No. 398,065, Jul. 14, 1982, Pat. No. 4,487,307.

[51] Int. Cl.4 .............................................. B65G 47/24
[52] U.S. Cl. ................................. 198/394; 198/463.4
[58] Field of Search ............... 198/382, 383, 389, 390, 198/394, 396, 491, 481, 478, 459, 461, 463.4

[56] References Cited

U.S. PATENT DOCUMENTS

| 2,283,615 | 5/1942 | Skinner et al. | 198/481 |
| 2,304,905 | 12/1942 | Gantzer | 198/459 |
| 2,471,479 | 5/1949 | Coons | 198/389 |
| 2,581,732 | 1/1952 | Thompson | 198/383 |
| 3,054,170 | 9/1962 | Benichasa et al. | 198/389 |
| 3,144,121 | 8/1964 | Smith | 198/382 |
| 3,797,639 | 3/1974 | Smith | 198/394 |
| 4,010,842 | 3/1977 | Smith | 198/394 |

*Primary Examiner*—Joseph E. Valenza
*Attorney, Agent, or Firm*—James F. Mitchell

[57] ABSTRACT

A pear orienting apparatus for receiving, orienting and subsequently feeding oriented pears with the stem-end lowermost to peeling and coring devices in a machine of the type described in U.S. Pat. Nos. 3,058,502 and 3,797,639 including a canted reciprocable shaker pan feeding singulated pears to at least one channeled lifter that tumbles the singulated pears over spaced divergent guide plates onto an inclined and intermittently gated delivery chute.

2 Claims, 5 Drawing Sheets

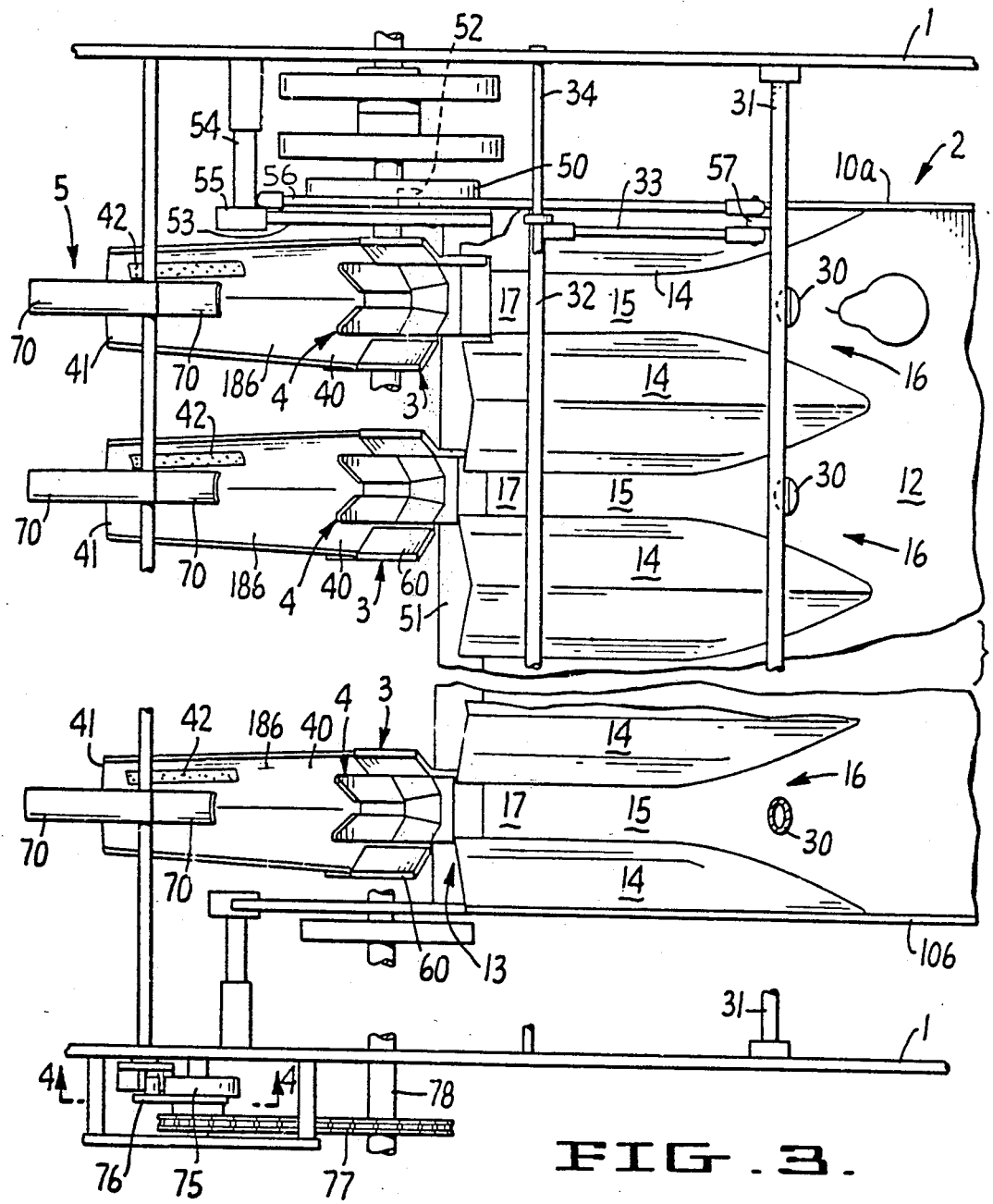
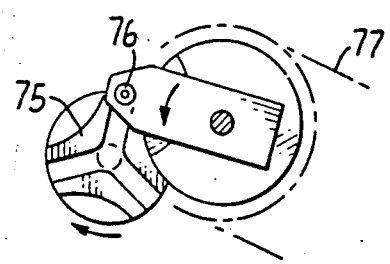
FIG. 3.
FIG. 4.

PEAR ORIENTING APPARATUS

This application is a division of application Ser. No. 398,065, filed Jul. 14, 1982 now U.S. Pat. No. 4,487,307 issued Dec. 11, 1984 and entitled Pear Orienting Apparatus.

BACKGROUND OF THE INVENTION

Heretofore pears have been fed to pear peeling and coring machines by orientors such as are disclosed in U.S. Pat. Nos. 3,144,121 and 3,797,639 issued to Laurence H. Smith. The latter patent discloses an inclined undated delivery chute in which some orientation takes place by differential friction. The chute feeds singulated pears to an orientation cup having spring biased side walls cooperating with a plunger mechanism 203 and a fingered belt 221 to assure pear orientation with the stem-end lowermost upon subsequent delivery to a transfer cup 204.

BRIEF DESCRIPTION OF THE INVENTION

This invention includes a reciprocable contoured channel bottom shaker pan feeding at least one channeled lifter that raises and tumbles singuated pears over spaced divergent fruit guide plates onto an inclined, but gated, delivery chute, such as 186 illustrated in Smith U.S. Pat. No. 3,797,639 to greatly improve the pear orientation capability of the machine prior to delivery of pears to the orientation cup, plunger mechanism 203 and fingered belt 221.

A principal object of the present invention is a pear orienting machine which provides significant pear orientation prior to delivery to the orientation cup, plunger and fingered belt components such as are described in U.S. Pat. No. 3,797,639.

An object of the invention is to provide a reciprocable delivery shaker pan having a central load sensor plate which provides uniform fruit loading to enhance the orientation and singulation functions of its contoured channel-bottom.

A further object of the invention is to provide channeled lifter means receiving singulated pears from the shaker pan for tumbling them over spaced divergent guide plates onto a delivery chute to orient the pears stem-end first as they enter the chute.

One other aspect of the invention is to provide intermittent stop gate means in an inclined delivery chute to temporarily arrest pear slide in the chute and thereby enhance orientation prior to discharge into an orientation cup like that of the patented Smith machine.

Other objects and advantages of the invention will be apparent from a consideration of the following description of a preferred embodiment and of the accompanying drawings.

BRIEF DESCRIPTION OF THE DRAWINGS

FIG. 3 is a partial top view of the machine taken along line 3—3 of FIG. 1 illustrating in detail the shaker pan configuration, lifters, delivery chutes and chute stop gates;

FIG. 4 is a partial illustration of the intermittent drive mechanism for the chute stop gates taken along line 4—4 of FIG. 3;

DESCRIPTION OF A PREFERRED EMBODIMENT

Figure 9:
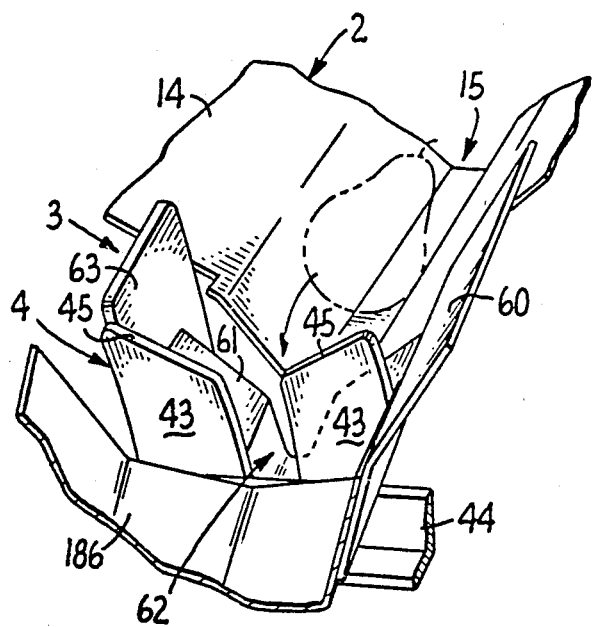
FIG. 9 is a perspective view of a lifter in its lowermost position prior to receipt of a pear from the shaker pan.

The pear orienting apparatus of this invention is mounted upon the frame 1 of a machine of the type shown in Laurence H. Smith U.S. Pat. No. 3,797,639 and replaces the shuffle feed and feed conveyor aspects of that machine. The orientor comprises a reciprocable contoured channel bottom shaker pan indicated generally at 2. A set of lifters 3 each of which receives singulated pears from the shaker pan, tumbles them over corresponding divergent guide plates 4, shown most clearly in FIGS. 9-11, onto a corresponding V-shaped inclined delivery chute 186. The delivery chutes are comparable to the chutes having that designation in Smith U.S. Pat. No. 3,797,639. Discharge from each of the set of delivery chutes 186 is controlled by corresponding intermittently indexible chute stop gates indicated generally at 5.

Figure 2:
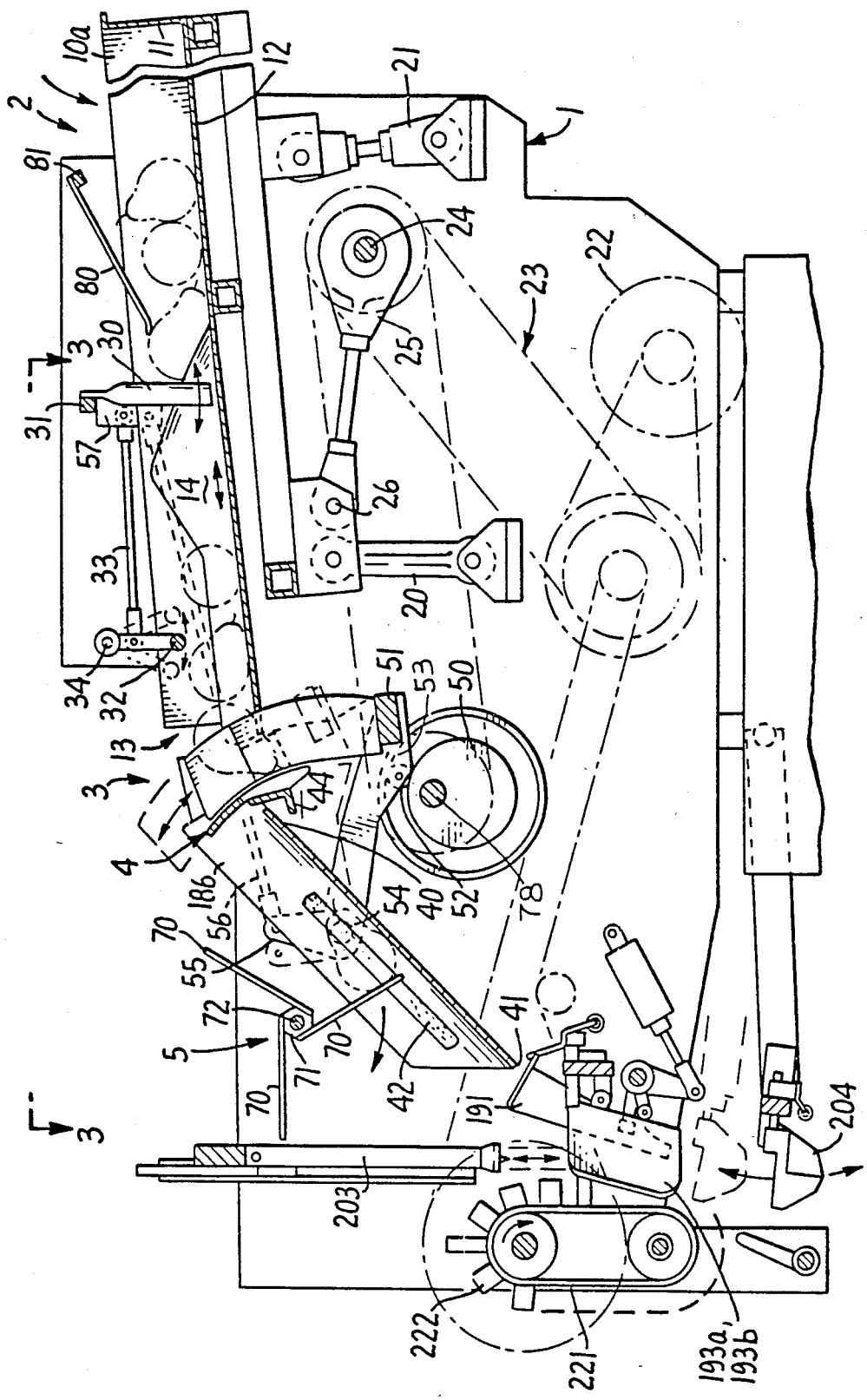
FIG. 2 is a vertical partial sectional view of the machine of FIG. 1.
Figure 7:
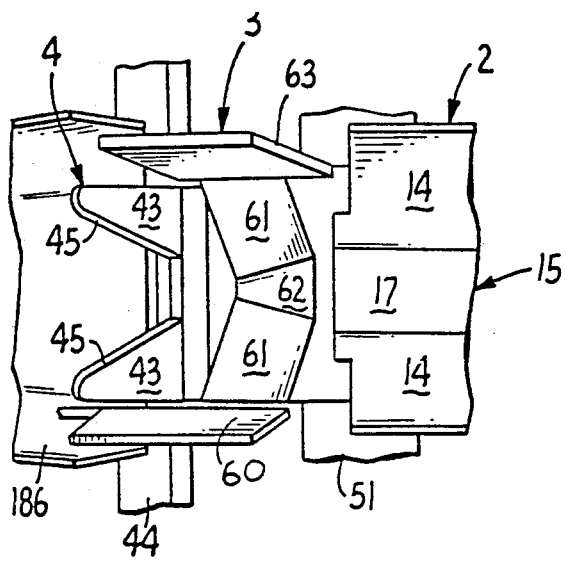
FIG. 7 is a top view of a lifter in combination with the shaker pan, guide plates and delivery chute.
Figure 8:
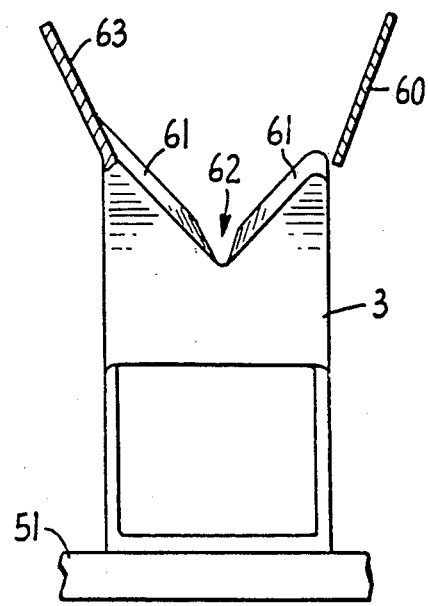
FIG. 8 is a front view of a lifter and cooperating frame-mounted fixed turning ear taken along line 8—8 of FIG. 5.

After passing through the foregoing components about 90% of the delivered pears have been oriented with the stem-end lowermost. Those few which are not oriented in that position upon delivery from chutes 186 are oriented stem-end lowermost by the subsequent orienting components of the machine including an orientation cup like that in Smith U.S. Pat. No. 3,797,639 as shown in FIG. 2 comprised of an inverted conical concave backpiece 191 and a pair of pivotally spring loaded side plates 193a, 193b; a reciprocable plunger 203; and a movable belt 221 with resilient fingers 222 for subsequent delivery to transfer cup 204. All of the components following the delivery chute 186 are more particularly described in Smith U.S. Pat. No. 3,797,639. By means of them the remainder of the delivered pears are properly oriented with the stem-end lowermost so that upon receipt in transfer cups 204 about 98% or more of the pear throughput has been properly oriented.

Figure 1:
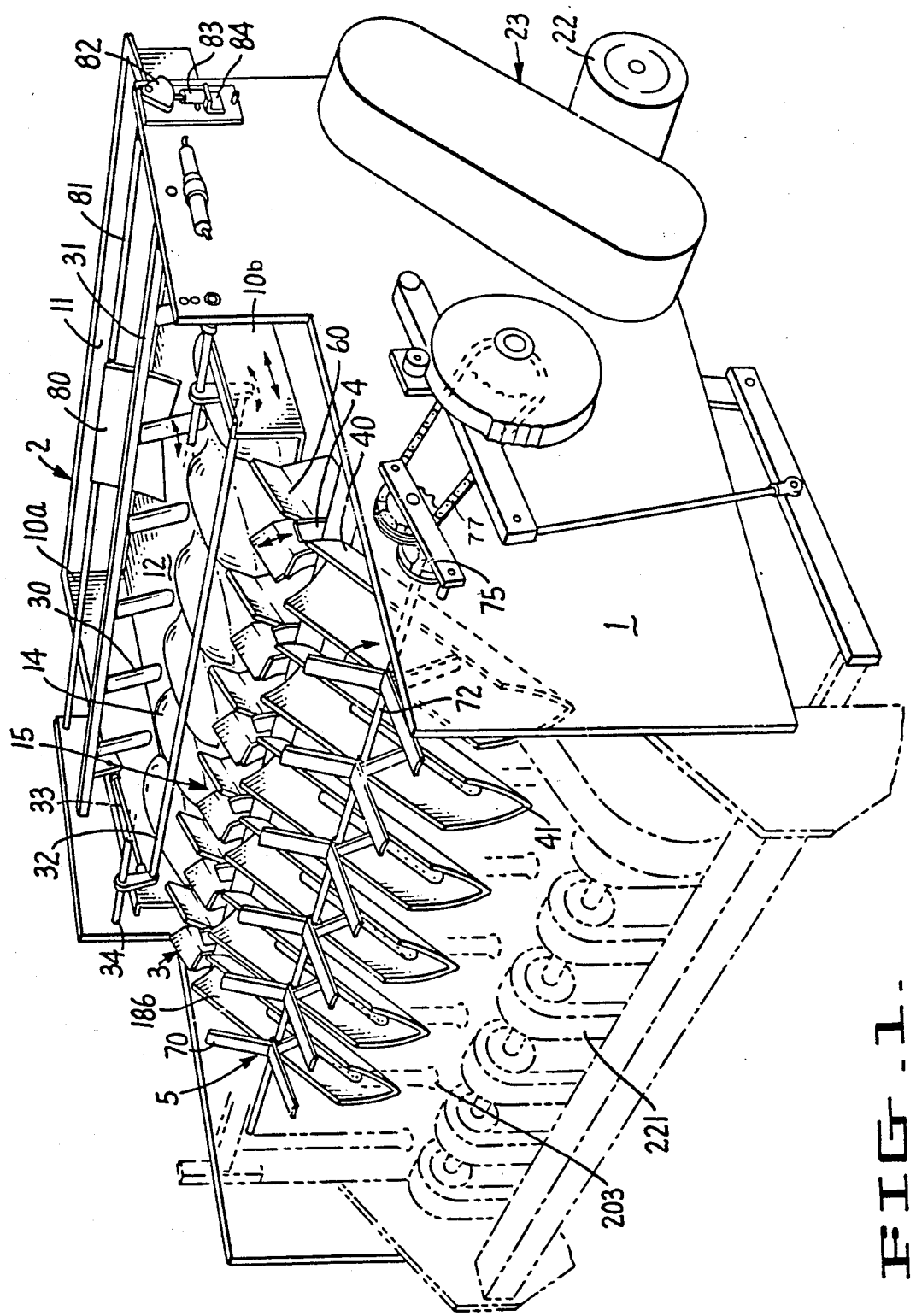
FIG. 1 is an overall perspective view of the pear orienting apparatus of this invention combined with a further orientation means disclosed in Laurence H. Smith U.S. Pat. No. 3,797,639.

The shaker pan 2 has a pair of side walls 10a, 10b; a back wall 11 and a contoured bottom as illustrated in FIGS. 1, 2 and 3. The bottom 12 is flat at its fruit receiving portion along the back wall 11. Along open discharge end 13 of the shaker pan its bottom is contoured into a series of humps 14 spaced from one another by singulation channels 15 each having a convergent entrance 16 and a straight sided exit 17. Each singulation channel 15 feeds a separate one of lifters 3.

The bottom 12 of the shaker pan cants downwardly toward its discharge end 13 about 5°. The pan mounts upon frame 1 on a pair of forward links 20 pivotally connected between the frame 1 and bottom 12 of the shaker pan and a pair of rear links 21 similarly pivotally connected but adjustable in length so that the cant of the shaker pan bottom 12 can be adjusted. Drive motor 22 through idler and a chain drive, referred to generally as 23, rotates a shaker drive shaft 24 upon which mounts a pair of eccentric shaker drive cranks 25 that pivotally connect at their other ends to the shaker pan at 26. The shaker drive cranks reciprocate the shaker pan with a throw of about ⅜ths of an inch at variable speeds of from about 450 to 300 complete cycles per minute as shown by the directional arrows in FIGS. 1 and 2.

The slightly downward reciprocatory motion of the shaker pan continuously moves pears delivered in bulk adjacent back wall 11 through singulation channels 15. Abutment of each pear base with the converging entrance 16 to each channel 15 as defined by the humps 14 tends to slow travel of the bulbous end and orient the pear stem-end forward as each pear traverses a channel 15. The channels 15 with their convergent entrances 16 also act to singulate the pears in line one by one for delivery through the straight sided channel exits 17 to the corresponding lifters 3.

Movement of the several pears in line through the shaker pan channels 15 is aided by a set of cluster breaker fingers 30, one mounted over the entrance 16 of each channel 15 upon a drive shaft 31, which fingers also reciprocate in timed relation to the vertical motion of the lifters 3 as will be hereinafter explained. A doubler bar 32 similarly reciprocates in unison with the cluster breaker fingers 30 slightly above the top of the set of humps 14. It knocks backwards pears which may be piled upon one another so as to help insure that only a single pear at a time is delivered to each of lifters 3. A link 33 pivotally connects crank arms depending from custer breaker drive shaft 31 and doubler bar axle 34 to coordinate reciprocation of the doubler bar 32 with that of cluster breaker fingers 30 all in timed relation with the vertical motion of the lifters 3 as is hereinafter described.

Spaced from the open discharge end 13 of the shaker pan 2 are a set of generally V-shaped delivery chutes 186 each of which slopes downwardly from an entrance end 40 to a discharge end 41 at about 35°-45° to the horizontal. As in Smith U.S. Pat. No. 3,797,639, these chutes are rigidly mounted upon the machine frame 1, each in line with one of the singulation channels 15 formed in the shaker pan bottom. The delivery chutes are fabricated from stainless steel sheet. A strip of frictional material 42, such as non-skid sheet, is preferably adhered to one side only of each V-shaped chute 186 upwardly from the bottom of the V to retard the slide of the bulbous end of any unoriented or one end of any breached pear and thereby turn it into the properly oriented position stem-end lowermost.

Entrance into each chute 186 is controlled by divergent guide plates 4 which comprise a pair of spaced, upwardly extending ears 43 curved forwardly in the particular embodiment illustrated in an arcuate form. The guide plate ears 43 fixedly mount upon an angle 44 secured to the machine frame 1 and each has a canted tip 45 which diverges outwardly and upwardly from the delivery chute longitudinal axis. The spacing between the ears 43 approximates the diameter of a typical pear stem-end.

Figure 5:
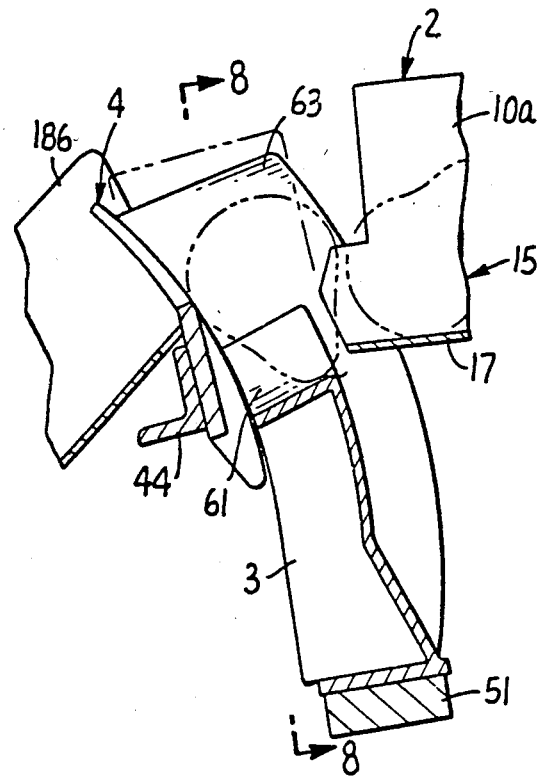
FIG. 5 illustrates in section a lifter in its lowermost fruit-receiving position and in cooperative relationship to the shaker pan, guide plates and delivery chute.
Figure 6:
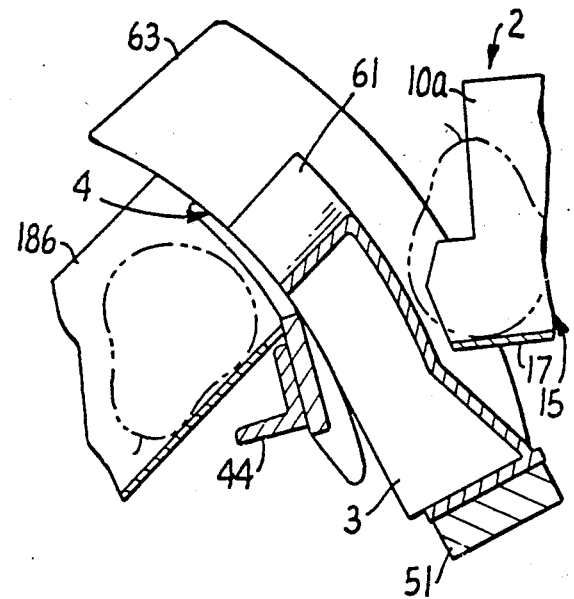
FIG. 6 illustrates in section a lifter in a mid-position of its stroke.

Between each of guide plates 4 and the open discharge end 13 of the shaker pan 2 is a lifter 3 aligned with each discharge chute 186 and its guide pates 4 and the corresponding exit 17 of the shaker pan singulation channel 15. Each lifter 3, as illustrated, also is arcuate in cross-section. By means of a control cam 50 shown in FIG. 2 the set of lifters 3 mounted on cross-bar 51 is simultaneously raised from a lower pear receiving position shown in FIGS. 5, 9 to an upper pear discharge position shown in FIG. 10. The lifter control cam 50 through cam follower 52 pivots the bell crank 53 about its axle 54 arcuately upwardly and downwardly with uniform harmonic motion about eleven times per minute. Crank arm 55 of bell crank 53 connecting link 56 reciprocates the cluster breaker bar 31 by means of crank means 57. Simultaneously with the vertical motion of the lifters 3, crank 55, link 56, crank 57 and ink 33 reciprocate the doubler bar 32 and the cluster breaker fingers 30 in coordination with the lifter motion at about eleven cycles per minute.

Each of the set of lifters 3 receives singulated pears in sequence from the more rapidly reciprocating shaker pan 2 and raises them upwardly so as to tumble them over the divergent guide plates 4 onto the corresponding inclined delivery chute 186. The top of each lifter is configured so that if it receives a pear with the stem-end foremost from the exit 17 of its corresponding singulation channel 15, the lifting motion maintains that orientation and in cooperation with the divergent top edges 45 of the ears 43 of guide plates 4 deposits the properly oriented pear in the same orientation upon the corresponding inclined chute 186. Approximately 60% of the pear throughput is properly oriented in the stem-end foremost position when received by the set of lifters 3. If a lifter receives a pear in a breached position, that is with its major axis transverse to the longitudinal axis of the delivery chute 186, the lifters in cooperation with a fixed turning ear 60 mounted upon the machine frame 1 and with the guide plates 4 turns the fruit so that it is properly oriented with the stem-end foremost. If a lifter receives a pear with the bulbous end first, the combination of its upward motion and the divergent top edges 45 of guide plate ears 43 tends to orient the pear with stem-end foremost for deposit upon corresponding chute 186.

Figure 10:
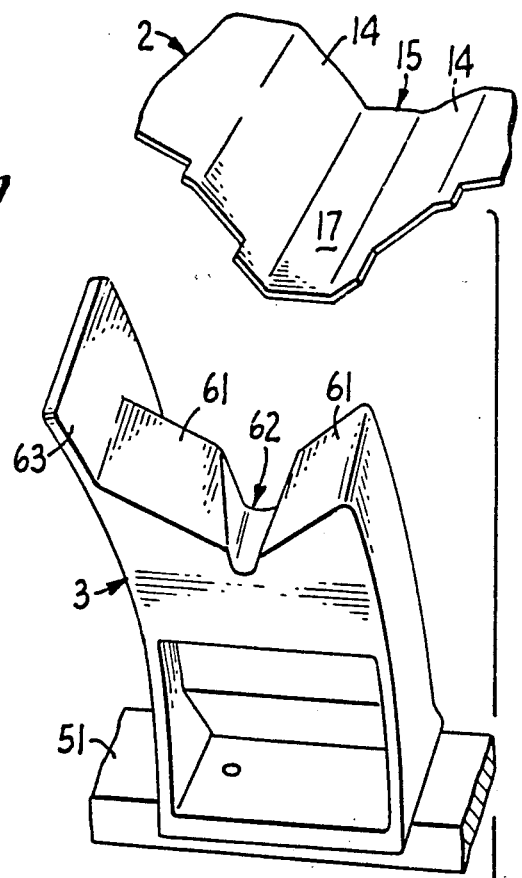
FIG. 10 is a perspective view of a lifter in its uppermost fruit-discharge position with a lifted pear about to tumble over the guide plates.
Figure 10:
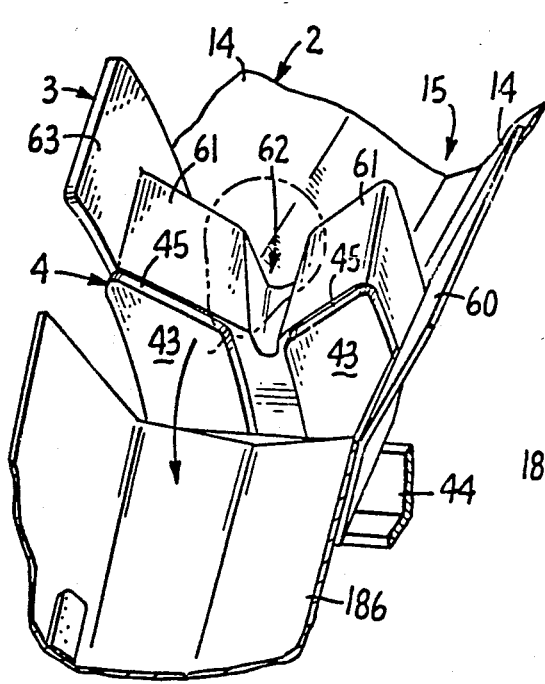
Figure 11:
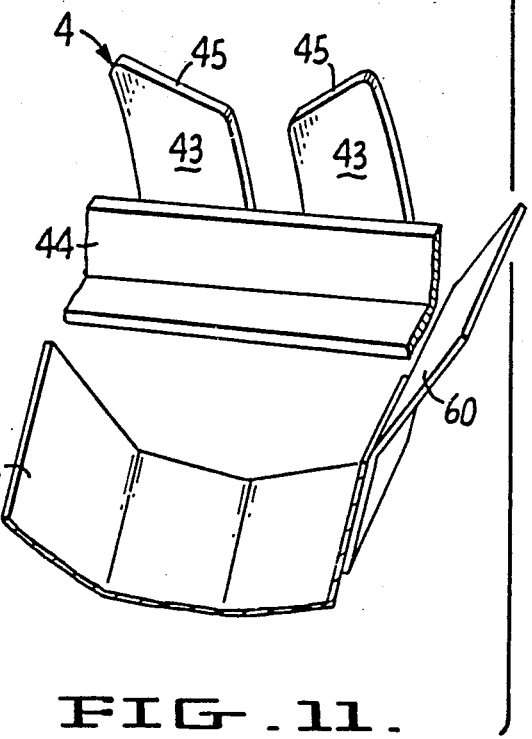
FIG. 11 is an exploded front view of a lifter and its cooperating shaker pan, spaced divergent guide plates, delivery chute and fixed turning ear.

To accomplish this orientation objective, the top of each lifter, as more particularly shown in FIGS. 5-11, has a pair of plane top faces 61 which diverge upwardly and outwardly at an included angle of about 90° from a central channel 62 aligned with the chute longitudinal axis. The central channel 62 approximates a typical pear stem-end diameter and the corresponding spacing between guide plate ears 43. Top faces 61 also cant slightly forward toward the ears 43 of the corresponding set of guide plates 4 so that in the lowermost position of FIG. 5 the faces more or less are coplanar with the exit 17 of a corresponding singulation channel 15 and in the upper position shown in FIG. 10 are more or less parallel to the surfaces of the delivery chutes 186. Along the outer side margin of one lifter face 61 is a first turning ear 63 extending generally vertically upwardly. It moves vertically with the lifter 3 and in combination with the second fixed turning ear 60 tends to turn any breached pear into a properly oriented position on the lifter top faces 61 with stem-end foremost in central channel 62. The central channel 62 accommodates the pear stem-end. It alone and in combination with the spacing between ears 43 greatly improves orientation capability. The central channels 62 also prevent jamming of pear stem-ends between the lifters 3 and the discharge end 13 of the shaker pan 2.

The discharge end of each delivery chute 186 is intermittently gated by a stop gate 5, each of which comprises a set of three gate fingers 70 mounted at 120° about hub 71 intermittently rotatable upon gate shaft 72 that is journalled on frame 1. The hub 71 and fingers 70 travel down the center of the V-shaped chutes and do not reverse direction. The fingers 70 are arcuate in cross-section so they provide a stiff stop gate to prevent pear slide down the chute when in the position shown in FIG. 2. Conversely, the fingers are flexible in the other direction so they will deflect upwardly should one rotate down on top of a pear lodged or sliding in the chute. The following finger 70, despite this flexibility, tends to push pears down the chute should they lodge in it following their arrest by the preceding finger 70 as the stop gate opens.

The Geneva wheel 75, illustrated in FIG. 4, by means of driver 76 and chain 77 intermittently drives the gate stop shaft 72 from control cam drive shaft 78. At the same time drive shaft 78 rotates lifter control cam 50. For each complete rotation of cam 50 and reciprocation of the set of lifters 3, the gate stop shaft 72 by means of Geneva wheel 75 rotates one-third of a revolution in following relation to the uppermost position of the lifters so that the gate fingers 70 open down the chute as the lifters proceed through their down-stroke. Each gate finger 70 is in the stop gating position shown in FIG. 2 at the time the lifters reach their uppermost fruit-discharge position. In this manner pears sliding down the delivery chutes 186 are briefly arrested by a gate finger 70. If a pear is not by that time properly oriented stem-end foremost, arresting of its slide and subsequent release provides a turning moment as the gate fingers 70 open tending to turn the pear into a properly oriented stem-end lowermost position. The Geneva drive provides an initially slow opening motion for the gate fingers 70 which enables unoriented pears to roll over as they again start down the chute.

A further important aspect of the invention is the load sensor plate assembly for the shaker pan 2 which provides a relatively uniform fruit flow. This assembly includes a pivotable sensor plate 80 spaced from the back wall 11 of the shaker pan 2 and overlying its flat bottom 12. The sensor plate 80 mounts upon a pivotable shaft 81 having at one end an actuating cam 82 that manipulates air valve 83 to develop a control signal.

The control signal may operate gate means (not shown) for delivering pears in bulk to the shaker pan at a preselected orientation of sensor plate 80.

The orientation of sensor plate 80 upon which the cam 82 actuates air valve 83 can be adjusted to accommodate differing fruit size by pivoting the bracket 84 upon which the valve 83 mounts relative to the cam to modify the sensor position at which air valve 83 becomes active. Sensor plate 80 is normally urged downward by its own weight. A full load of piled pears in shaker pan 2 tends to move sensor plate 80 upward until cam 82 activates air valve 83 to close off the bulk supply of fruit. As the pears are singulated and discharged from the open discharge end 13 of the shaker pan, the pressure upon sensor plate 80 becomes less and it pivots downward until cam 82 deactivates air valve 83 and a control signal develops to dump a fresh supply of bulk pears into the shaker pan.

The sensor plate 80 mounts centrally in the shaker pan. Because of that location pears are dumped from bulk at frequent intervals at the pan center behind the sensor plate 80 and they spread to each side of the pan. This provides a generally uniform flow of fruit into the pan and enhances the ability of the pan and accompanying cluster breaker fingers 30 and doubler bar 32 to singulate and feed the pears to the discharge end 13 of the shaker pan.

Various modifications of the described embodiment may become apparent to those familiar with pear orienting art. The invention is more particularly defined in the following claims.

We claim:

1. In a pear orienting apparatus having at least one generally V-shaped inclined delivery chute with a lower discharge end, means for enhancing orientation of parts exiting from the chute with the stem-end lowermost comprising an indexible chute stop gate overlying the discharge end of the chute to arrest the pear slide in the chute and having at least one finger intermittently movable down the chute with stiffness against deflection in the downward direction and flexibility in the other direction; and means for intermittently opening the chute stop gate to permit further pear slide in the chute.

2. The pear orienting apparatus of claim 1 wherein the means for intermittently opening the chute stop gate provides an initially slow, followed by a more rapid opening motion for said finger.

* * * * *